(12) United States Patent
Fukumura et al.

(10) Patent No.: US 8,011,136 B2
(45) Date of Patent: Sep. 6, 2011

(54) POWER CLOSURE ACTUATOR

(75) Inventors: Tomohiro Fukumura, Rochester Hills, MI (US); Jose Maria Garcia, Troy, MI (US)

(73) Assignee: Hi-Lex Corporation, Troy, MI (US)

( * ) Notice: Subject to any disclaimer, the term of this patent is extended or adjusted under 35 U.S.C. 154(b) by 1073 days.

(21) Appl. No.: 11/335,130

(22) Filed: Jan. 19, 2006

(65) Prior Publication Data

US 2007/0163179 A1 Jul. 19, 2007

(51) Int. Cl.
 *E05F 11/54* (2006.01)
(52) U.S. Cl. .............................. 49/360; 49/324; 475/338
(58) Field of Classification Search ............... 049/360, 049/352, 349, 324; 475/338
 See application file for complete search history.

(56) References Cited

U.S. PATENT DOCUMENTS

| | | | | |
|---|---|---|---|---|
| 3,625,328 | A * | 12/1971 | Carli | 192/142 R |
| 4,408,501 | A | 10/1983 | Liang et al. | 74/688 |
| 5,459,925 | A | 10/1995 | Akeel et al. | 29/893.2 |
| 5,567,201 | A | 10/1996 | Ross | 475/280 |
| 5,842,684 | A | 12/1998 | Aho | 254/344 |
| 6,104,112 | A | 8/2000 | Vanjani | 310/64 |
| 6,179,742 | B1 * | 1/2001 | Haag et al. | 475/154 |
| 6,530,863 | B2 | 3/2003 | Balli et al. | 479/149 |
| 6,553,719 | B1 | 4/2003 | Stone et al. | 49/358 |
| 6,629,905 | B1 * | 10/2003 | Sesselmann et al. | 475/149 |
| 6,819,022 | B2 | 11/2004 | Yamamoto et al. | 310/156.05 |
| 6,851,343 | B2 | 2/2005 | Sasaki | 81/475 |
| 6,904,717 | B2 * | 6/2005 | Clark et al. | 49/28 |
| 6,931,959 | B2 * | 8/2005 | Giuriati | 74/413 |
| 6,944,906 | B2 | 9/2005 | Moein et al. | 15/250 |
| 7,032,349 | B2 * | 4/2006 | Oberheide et al. | 49/360 |
| 7,354,370 | B2 * | 4/2008 | Sesselmann | 475/149 |
| 2002/0112404 | A1 * | 8/2002 | Au Truong | 49/360 |
| 2006/0247089 | A1 * | 11/2006 | Guo et al. | 475/338 |

OTHER PUBLICATIONS

Hi-Lex Controls, Inc.'s *Hi-Lex Patent Disclosure No. 05-06-001*, pp. 10-49.

* cited by examiner

*Primary Examiner* — Gregory J. Strimbu
(74) *Attorney, Agent, or Firm* — Young Basile Hanlon & MacFarlane PC

(57) ABSTRACT

A power closure actuator especially suitable for use in powering various automotive closure devices. The actuator includes a brushless pancake electric motor having an output shaft; a sun gear on the output shaft; a plurality of compound planet gears each having a large diameter lower portion meshingly engaging the sun gear and a small diameter upper portion; a ring gear surrounding and meshingly engaging the small diameter upper portions of the planet gears, and a cable drum splined to the ring gear. A mounting plate positioned in overlying confronting relation to the flat upper face of the motor mounts a plurality of planet shafts extending upwardly from the mounting plate in circumferentially spaced relation to the motor output shaft with one of the compound planet gears journaled on each planet shaft.

30 Claims, 14 Drawing Sheets

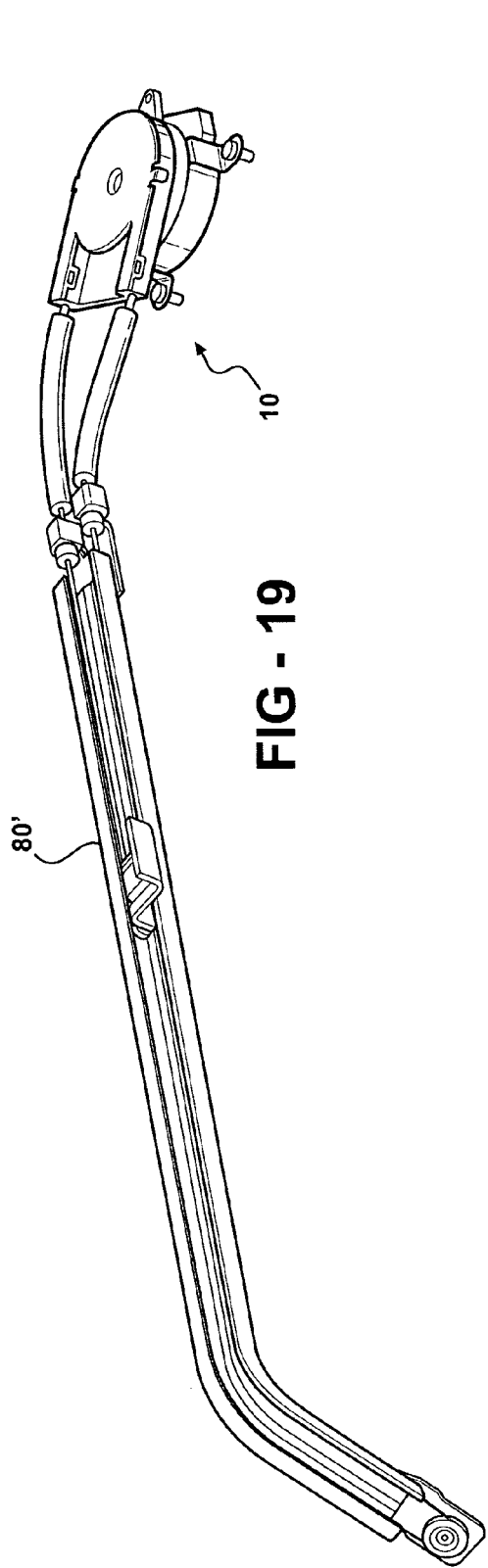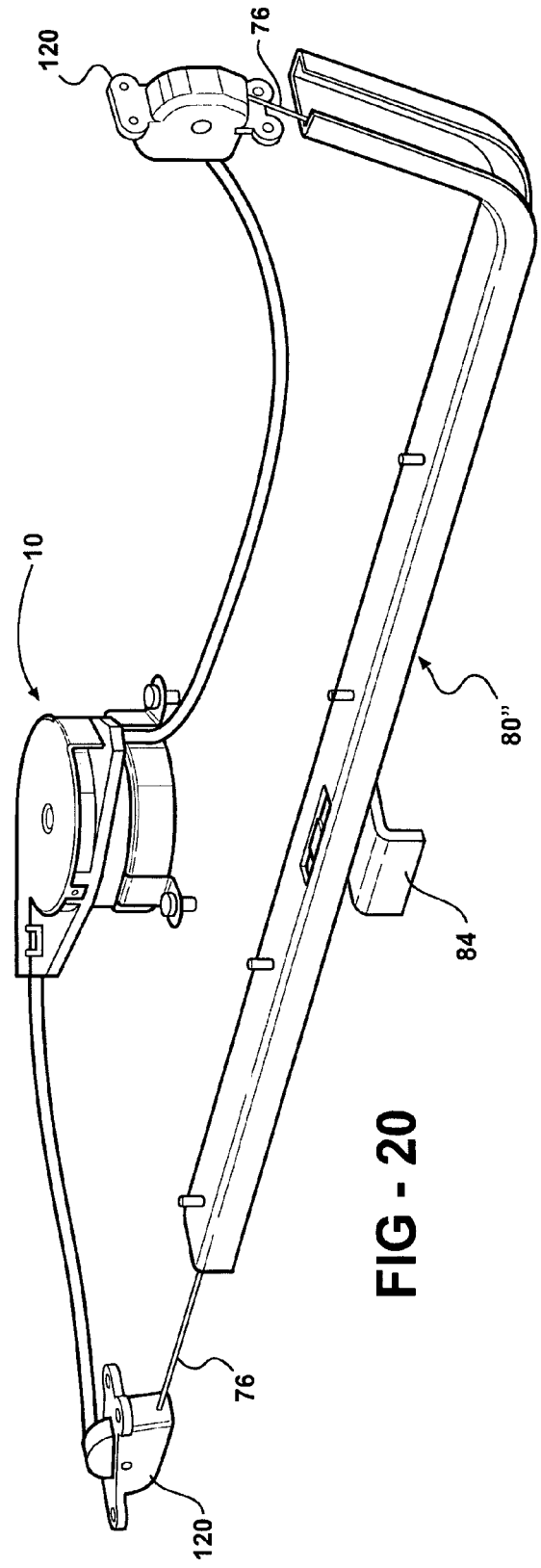

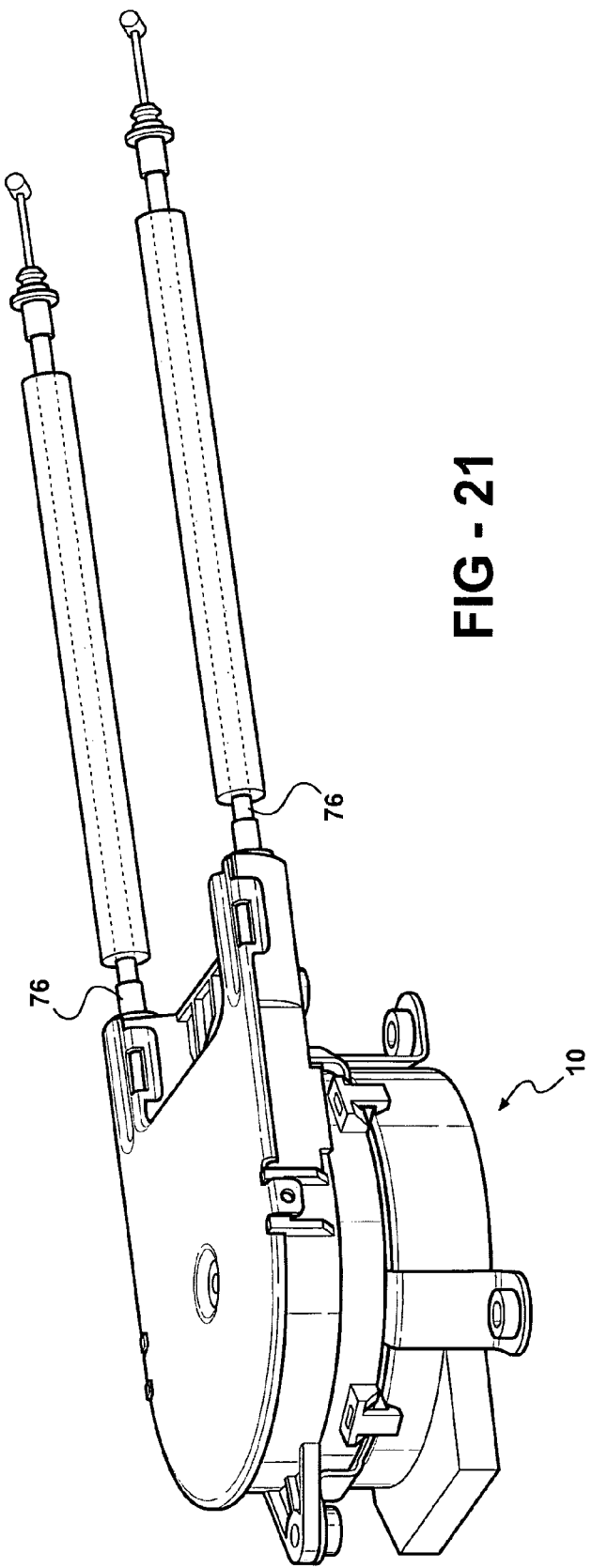

POWER CLOSURE ACTUATOR

FIELD OF THE INVENTION

This invention relates to drive units and more particularly to a drive unit especially suitable for use as a power closure actuator for operating a motor vehicle closure member.

BACKGROUND OF THE INVENTION

Power closure actuators are in wide use in modern day motor vehicles to power such closure devices as sliding doors, lift gates, tail gates, window regulators and sun roofs. Whereas the previously proposed and/or utilized actuators have been generally satisfactory, each of the prior art devices suffers from one or more disadvantages. Specifically, either the closure actuator has not provided universal applicability in all closure scenarios and/or the actuator has consumed a large volume of valuable space in a crowded automotive environment and/or the actuator has suffered reliability and/or durability problems and/or the actuator has been prohibitively expensive. Further, the prior art actuators lack back-drivability. That is, if the clutch for disengaging the drive unit from the remainder of the actuator system becomes stuck or remains engaged due to a failure of the Electronic Control Unit, the closure member cannot be opened or closed manually with consequent inconvenience or safety concerns.

SUMMARY OF THE INVENTION

This invention relates to an improved drive unit for automotive use.

More specifically, this invention relates to a power closure actuator for automotive use that is universally applicable to the various automotive closure devices, that is readily serviceable, that is compact, that is reliable even over extended periods of usage, that is readily manually back-drivable in the event of power system failure, and that is relatively inexpensive to produce.

SUMMARY OF THE INVENTION

The actuator or drive unit of the invention includes a brushless electric motor having an output shaft; a sun gear on the output shaft of the motor; a plurality of compound planet gears each having a large diameter lower portion meshingly engaging the sun gear and a small diameter upper portion; and a ring gear surrounding and meshingly engaging the small diameter upper portions of the planet gears.

According to a further feature of the invention, the electric motor has a flat upper face; the output shaft extends upwardly from the upper face; the drive unit further includes a mounting plate positioned in overlying, confronting relation to the flat upper face of the motor and including a central aperture passing the motor output shaft, and a plurality of planet shafts extending upwardly from the mounting plate in circumferentially spaced relation to the out put shaft; the sun gear is positioned on the output shaft above the mounting plate; and a compound planet gear is journaled on each planet shaft.

According to a further feature of the invention, the drive unit further includes bearing structure on an upper end of the motor output shaft journaling the ring gear.

According to a further feature of the invention, the drive unit further includes a cable drum secured to the ring gear in surrounding relation to the ring gear.

According to a further feature of the invention, the cable drum is splined to the ring gear to facilitate ready removal of the cable drum for servicing.

According to a further feature of the invention, the drive unit further includes a plurality of posts upstanding from the mounting plate in circumferentially spaced relation to the motor output shaft and an annular support plate fixedly secured to upper ends of the posts at circumferentially spaced locations on the support plate and receiving the upper ends of the planet shafts.

According to a further feature of the invention, the drive unit further includes an annular gear case positioned in surrounding relation to the lower portions of the planet gears and positioned on the mounting plate.

According to a further feature of the invention, the drive unit further includes an elongated rail plate, a plurality of pulleys mounted on the rail plate, a carrier, and a cable trained around the cable drum, guiding around the pulleys, and fixedly secured to the carrier, the carrier moving along the rail plate in response to rotation of the cable drum.

According to a further feature of the invention, an end of the rail plate is secured to the mounting plate.

According to a further feature of the invention, the mounting plate is secured to a planar member and the motor is sandwiched between the mounting plate and the planar member.

According to a further feature of the invention, the drive unit further includes a cable drum housing assembly encircling the cable drum and defining entry and exit guide channels for a cable entrained around the cable drum.

According to a further feature of the invention, the drum housing assembly includes a lower annular member surrounding the cable drum and a cover member overlying the cable drum and coacting with the lower annular member to encapsulate the cable drum and define the entry and exit guide channels.

According to a further feature of the invention, the housing assembly is fixedly secured to the mounting plate.

BRIEF DESCRIPTION OF THE DRAWINGS

The description herein makes reference to the accompanying drawings wherein like reference numerals refer to like parts throughout the several views, and wherein:

FIG. 19 illustrates an alternate embodiment of the invention mounting the drive unit on the interior side of the vehicle body structure;

FIG. 20 illustrates an alternate embodiment of the invention illustrating a mounting for the drive unit proximate the D pillar of the vehicle; and FIG. 21 illustrates an alternate embodiment of the invention in which the drive unit is mounted within the door of the vehicle.

DETAILED DESCRIPTION OF THE PREFERRED EMBODIMENT

Figure 1:
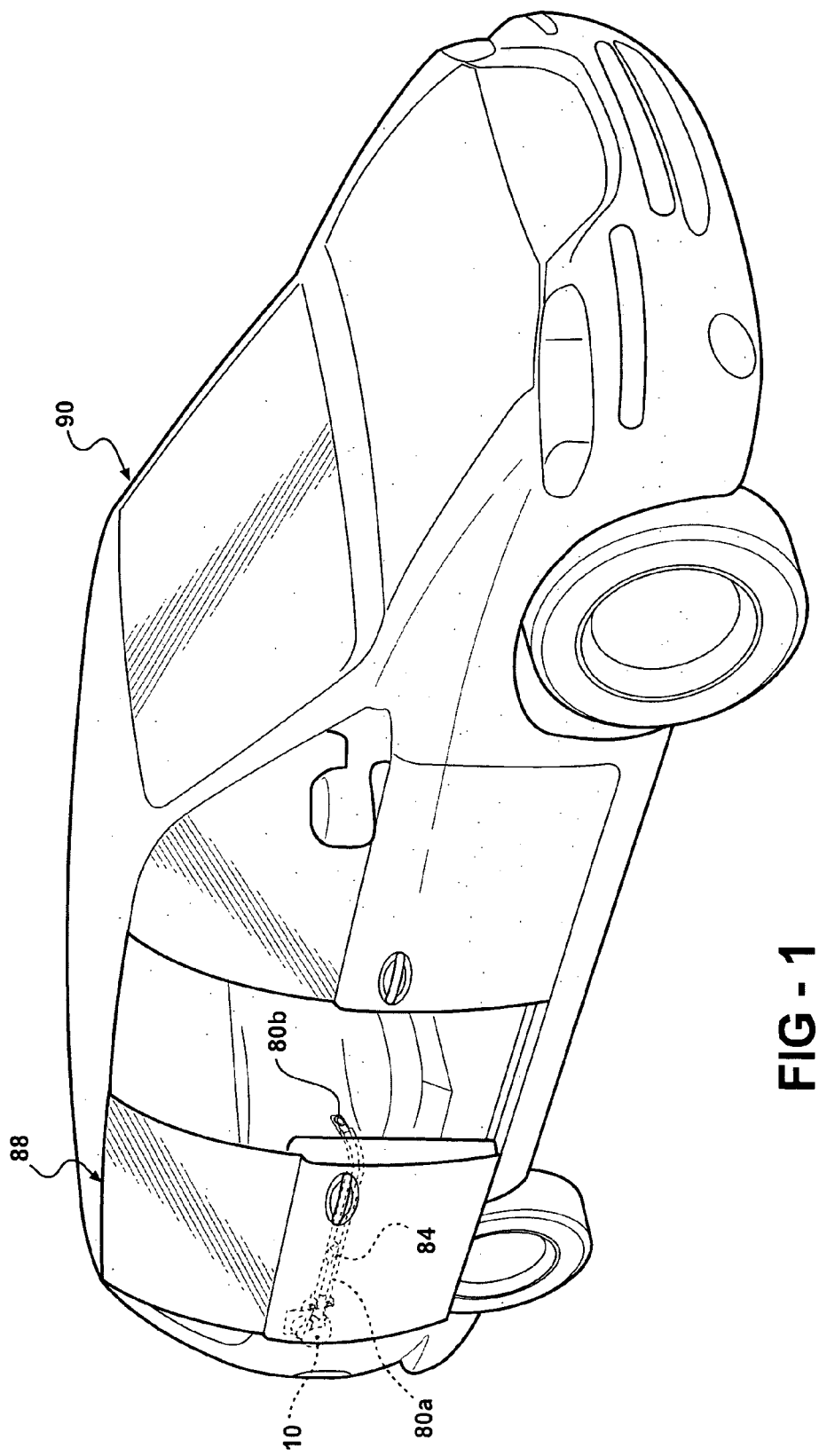
FIG. 1 is a perspective view of a motor vehicle of the mini-van type showing a drive unit according to the invention serving as the power closure actuator for a sliding door of the mini-van.
Figure 2:
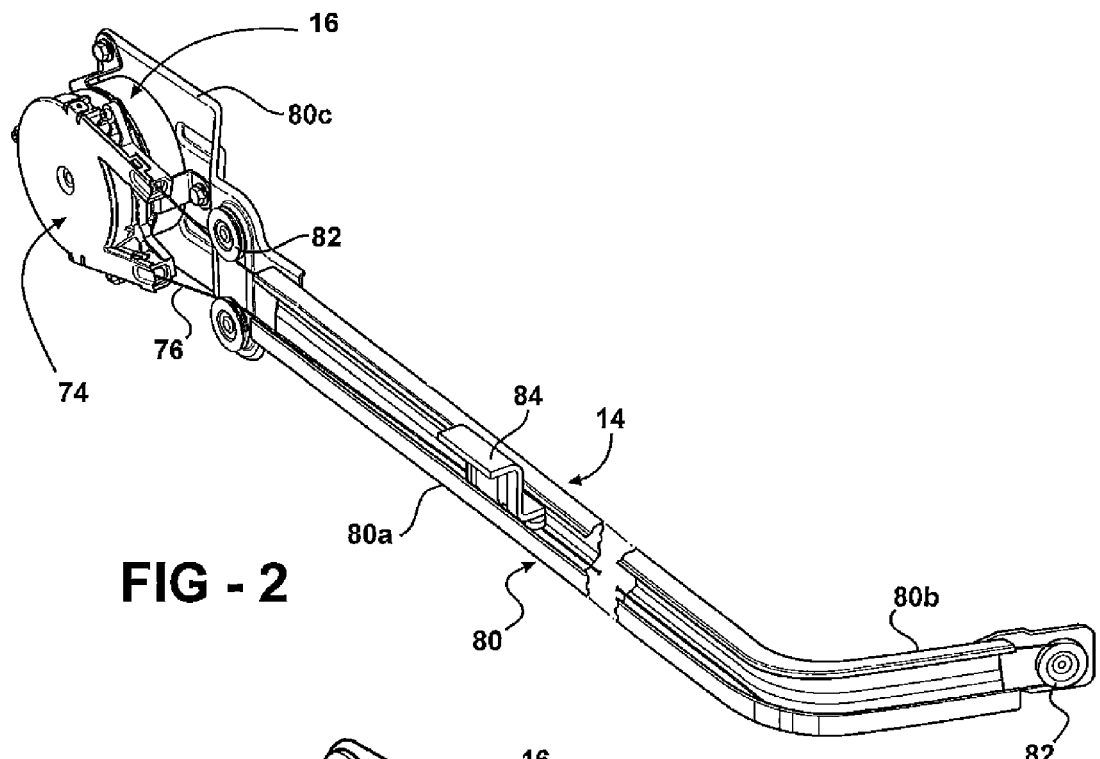
FIG. 2 is a perspective view of the power closure actuator.
Figure 3:
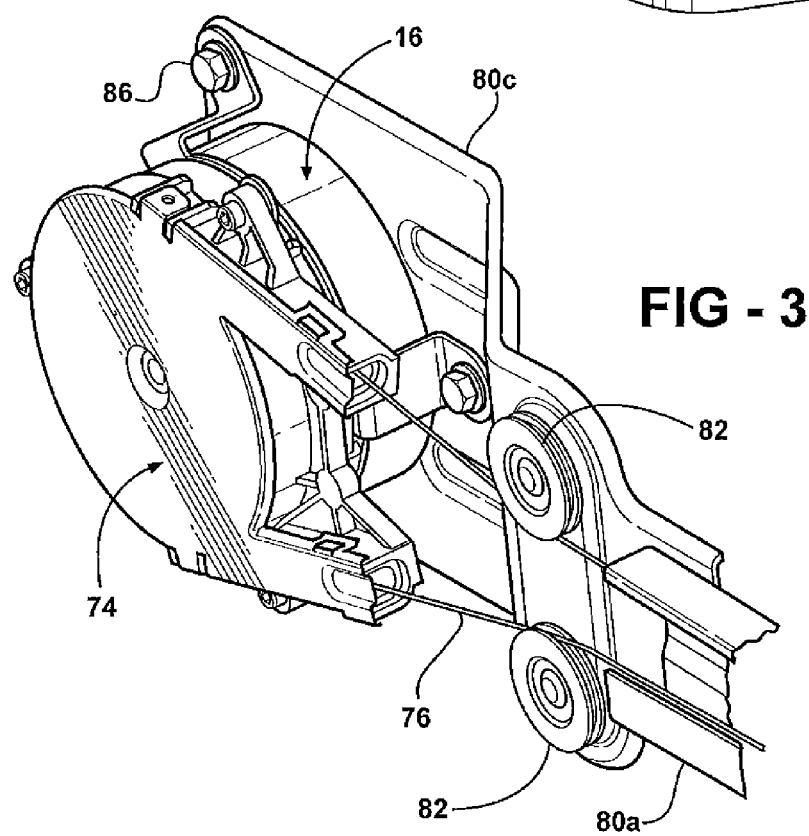
FIG. 3 is a perspective view of the actuator.

With initial reference to FIGS. 1-13, the power closure actuator of the invention, broadly considered, includes a drive unit 10, a cable drum assembly 12 and a rail assembly 14.

Drive unit 10 includes a motor 16, a lower mounting plate 18, a sun gear 20, planet gears 24, a gear case 26, an upper mounting plate 28, and a drum ring gear 30.

Motor 16 is a brushless pancake motor of flat circular configuration and includes a casing 32 having a flat upper wall 32a and a central output post 32b; a laminated steel stack 34; a winding 36; a permanent magnet 38; an output shaft 40 centered in output post 32b; Hall Effect sensors (not referenced); and a ball bearing 48.

Lower mounting plate 18 has a circular configuration corresponding to the circular configuration of the upper face 32a of the motor casing and is positioned in overlying confronting relation to the upper face of the motor and secured to the upper face of the motor via screws 52 passing through suitable apertures in the periphery of the mounting plate for engagement with threaded bores in the upper face of the motor.

Plate 18 includes circumferentially spaced legs 18a downstanding from the circular main body 18b of the plate; a circular central aperture 18c passing motor output shaft 40 and output post 32b, and a plurality of circumferentially spaced lugs 18d, 18e and 18f upstanding from the main body 18b. Plate main body 18b further defines a plurality of circumferentially spaced, downwardly opening sockets 18g, and a further plurality of circumferentially spaced, downwardly opening sockets 18h circumferentially interspersed with respect to the sockets 18g. The head 54a of a planet shaft 54 is positioned in each socket 18g with the main body pivot shaft portion 54b of the planet shaft extending upwardly from the plate, and the head 56a of a post 56 is positioned in each socket 18h with the main body shaft portion 56b of the post extending upwardly from plate 18b. It will be seen that the heads 54a/56a are fixedly trapped between the respective socket and the upper face 32a of the motor 16 with the plate secured to the upper face of the motor.

Sun gear 20 comprises a pinion gear that is fixedly secured to motor output shaft 40 in overlying relation to motor output post 32b.

A planet gear 24 is journalled by each planet shaft 54. Each planet gear 24 is a compound gear including a large diameter lower portion 24a and a small diameter upper portion 24b. Lower portions 24a meshingly engage with sun gear 20.

Figure 4:
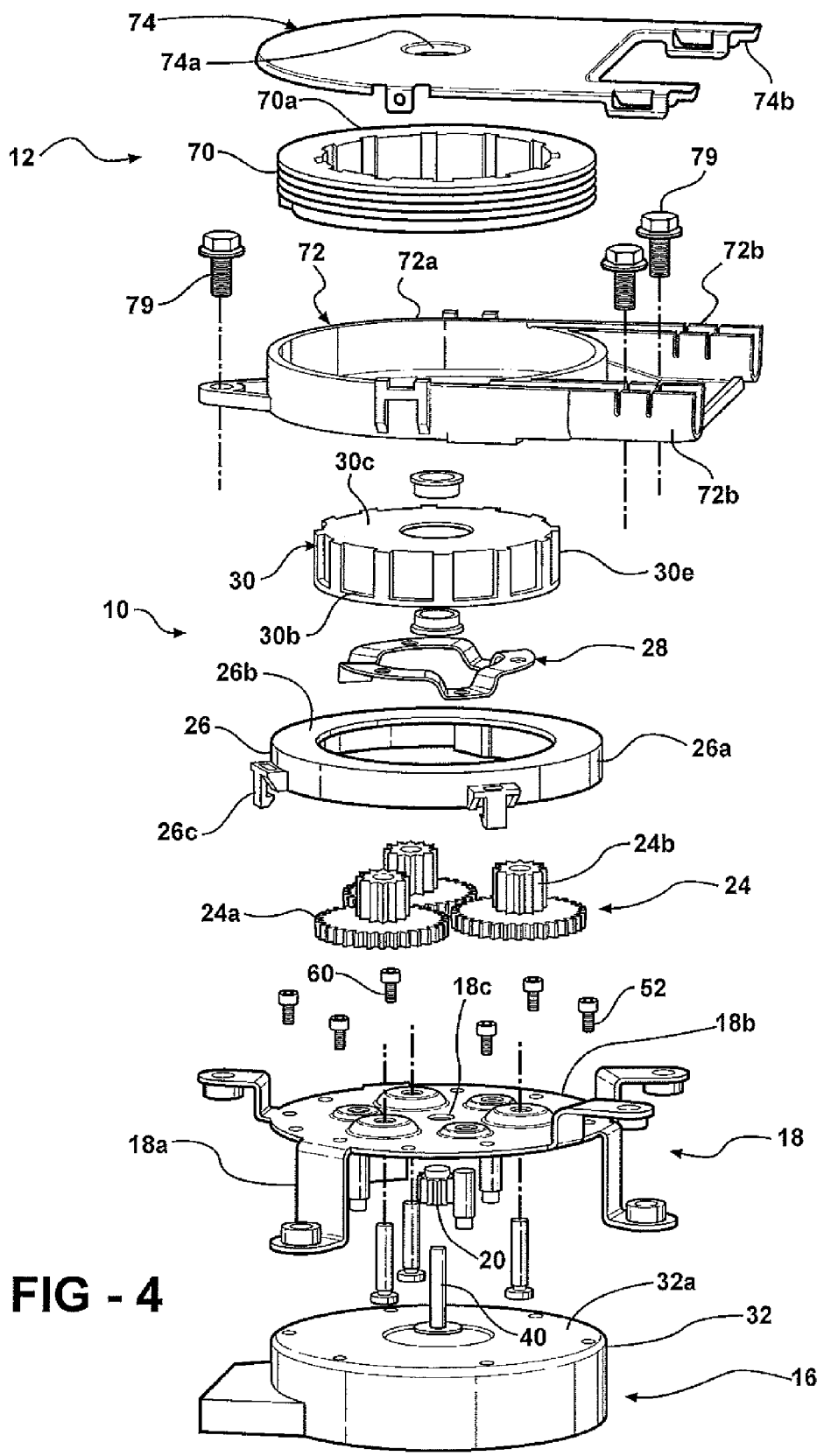
FIG. 4 is an exploded perspective view of the actuator.
Figure 5:
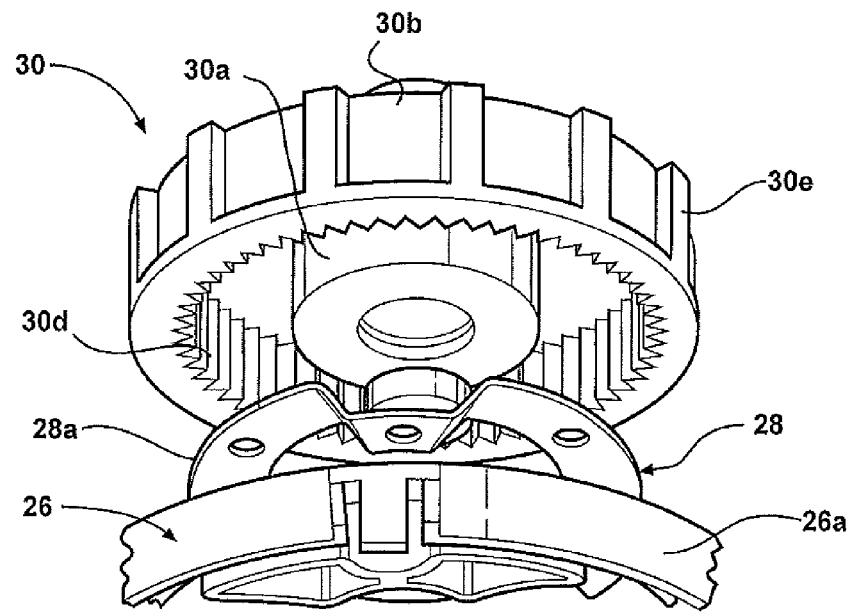
FIG. 5 is a detail view of the actuator.
Figure 7:
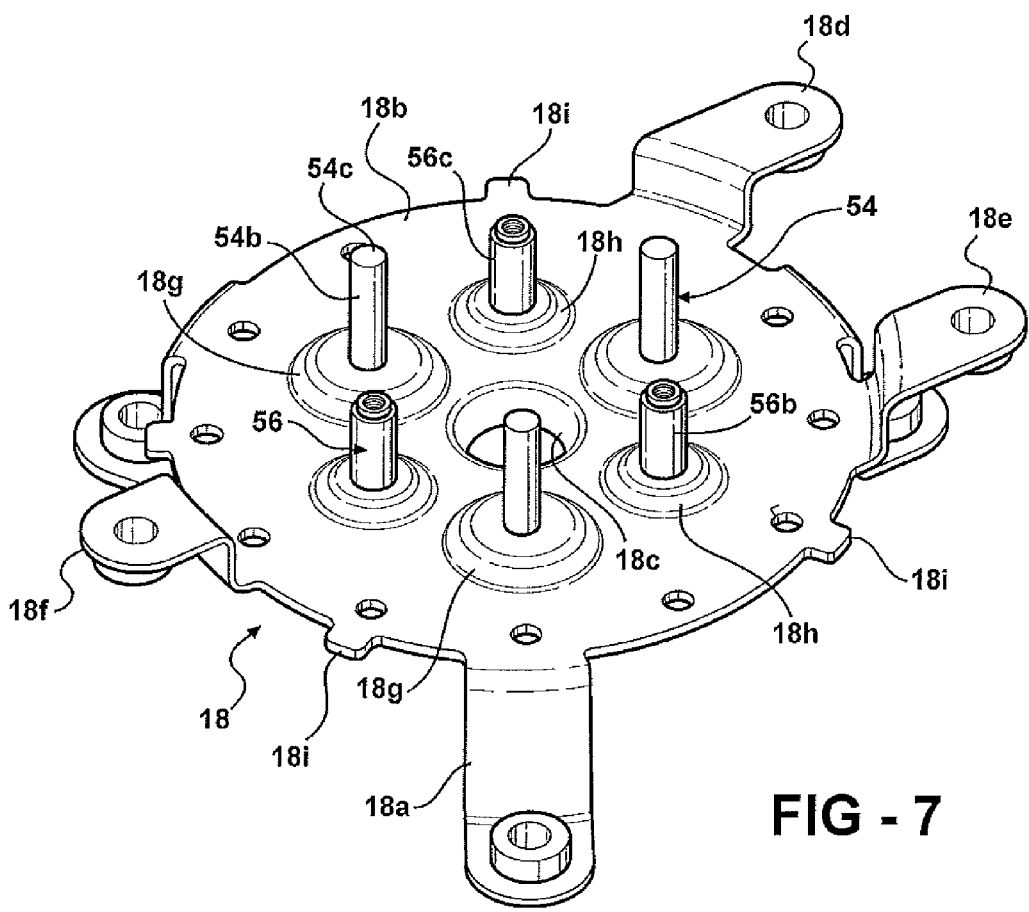
FIG. 7 is a perspective view of a support plate assembly forming a part of the actuator.
Figure 6:
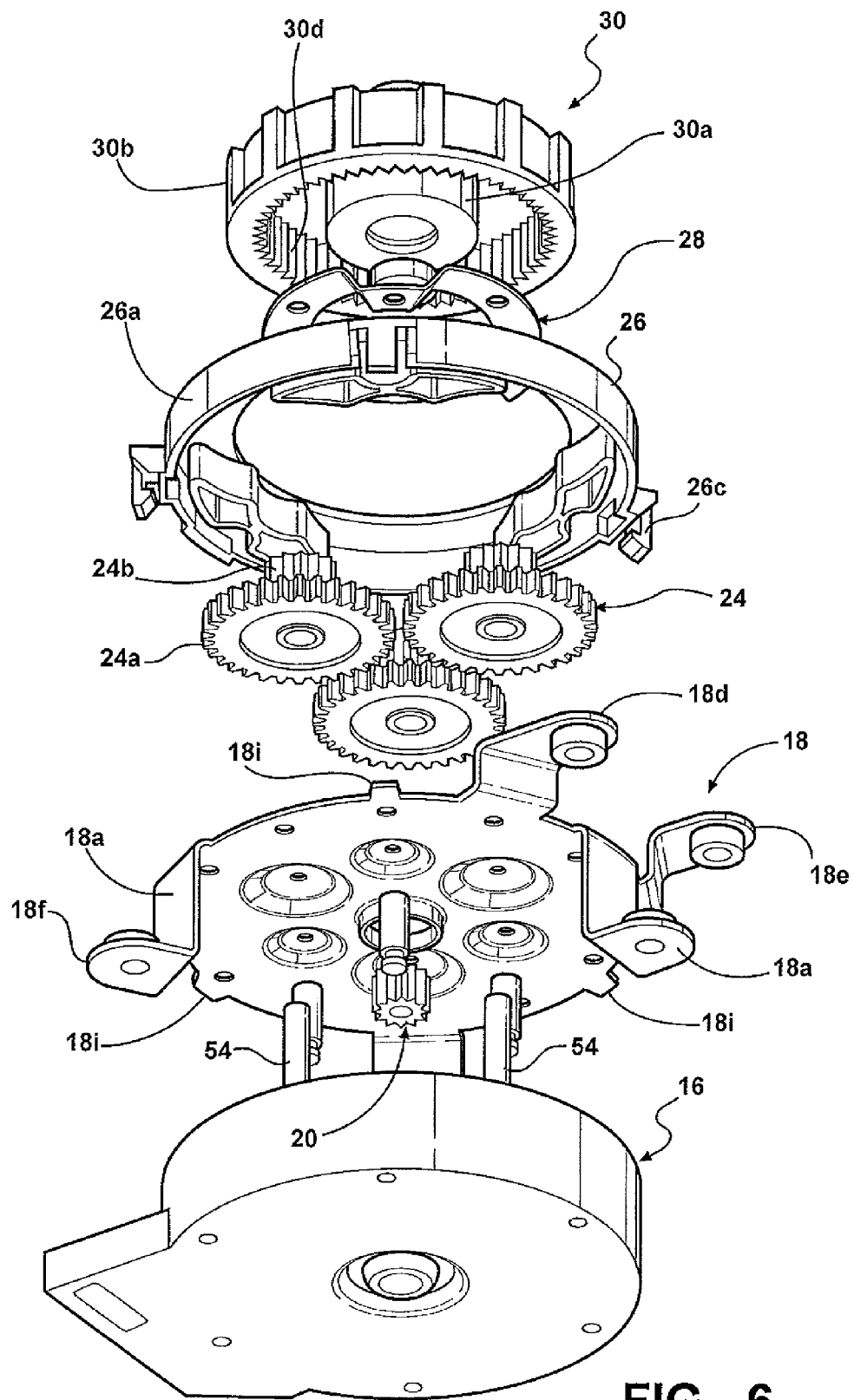
FIG. 6 is a further exploded perspective view of the actuator.
Figure 8:
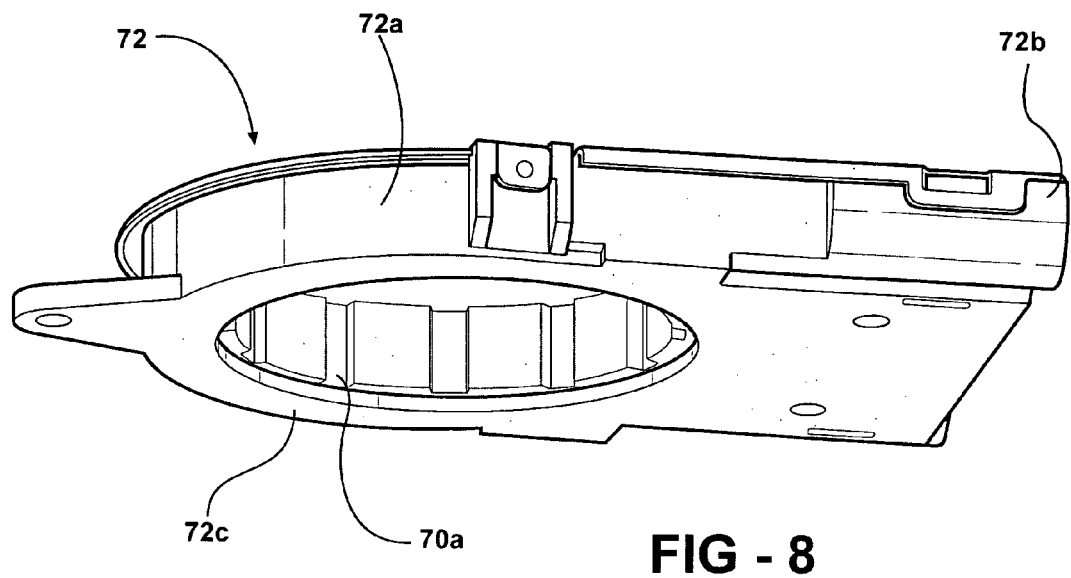
FIGS. 8 and 9 are detail views of a cable drum assembly utilized in the closure actuator.
Figure 9:
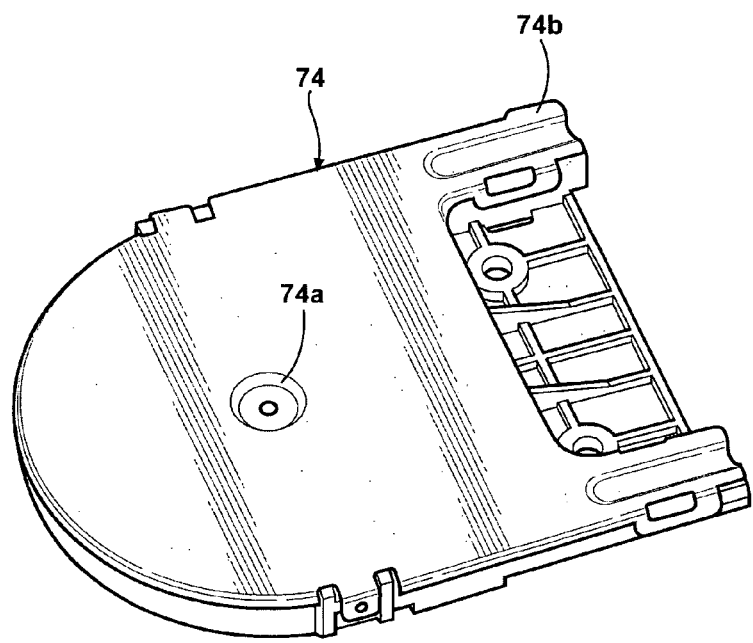
Figure 10:
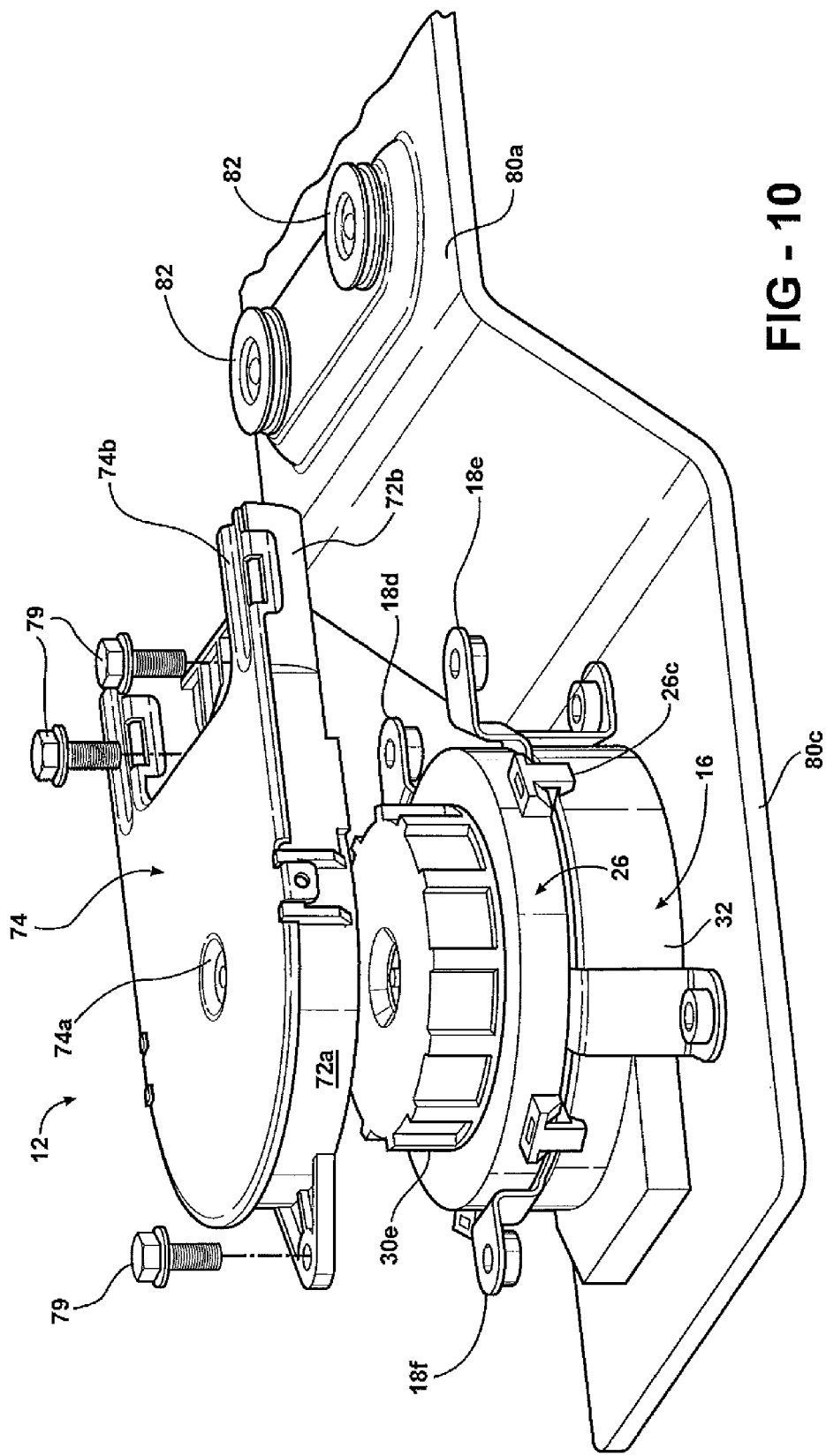
FIG. 10 is a perspective exploded view showing the interaction of the cable drum assembly with a drive unit of the actuator.
Figure 11:
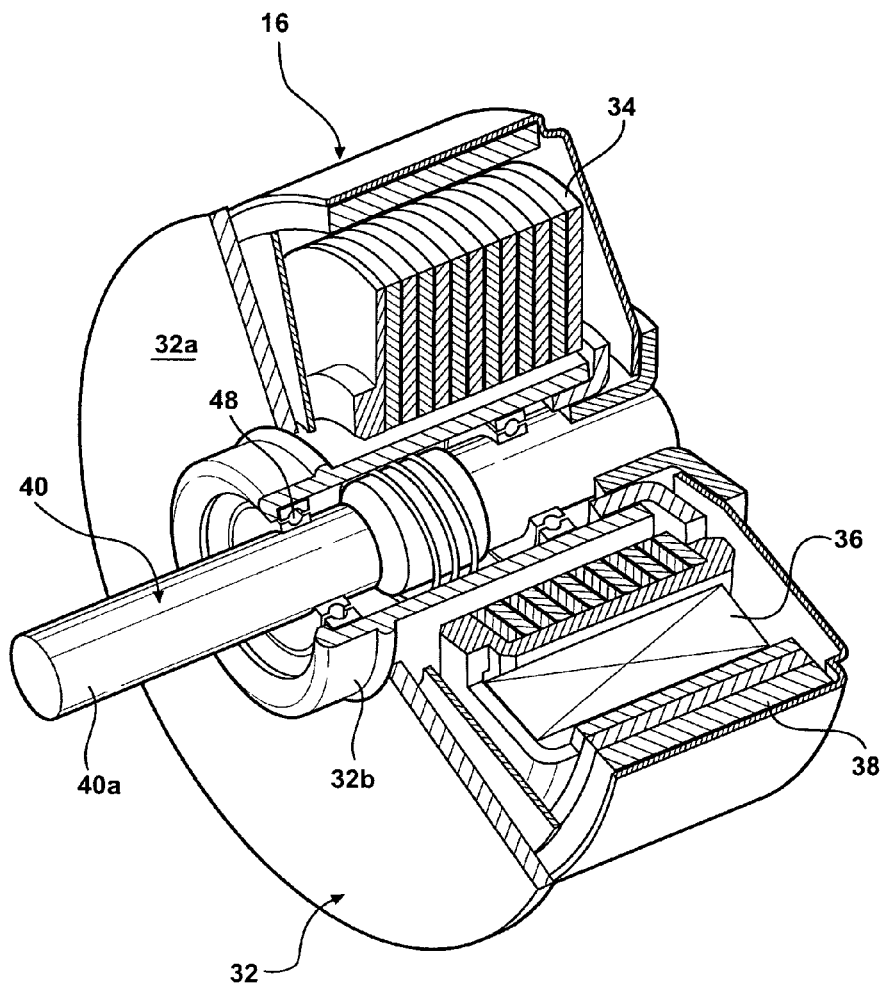
FIG. 11 is a perspective broken away view of a motor forming a part of the drive unit.
Figure 12:
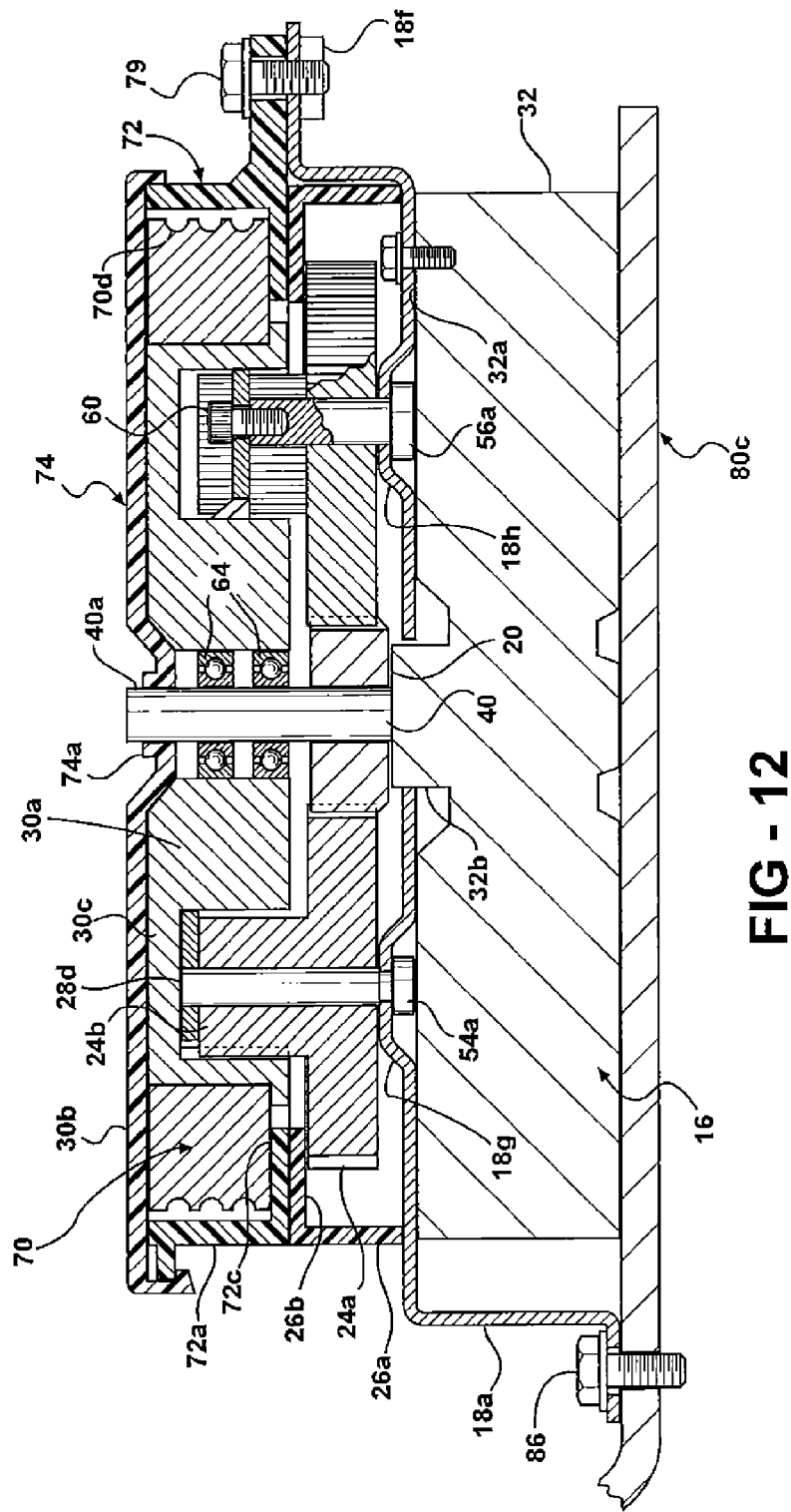
FIG. 12 is a cross-sectional view of the drive unit.
Figure 13:
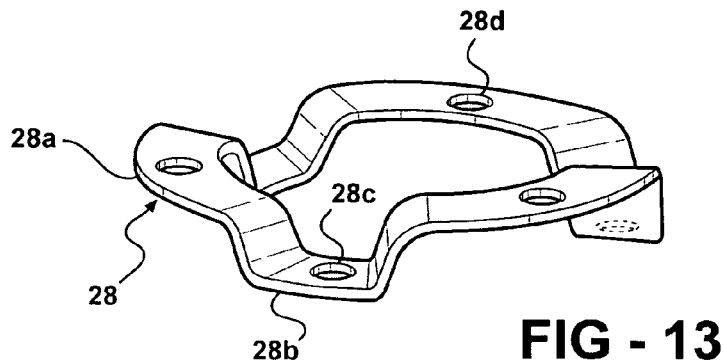
FIG. 13 is a perspective view of a support plate utilized in the drive unit.

Gear case 26 has an annular configuration and includes an annular side wall portion 26a positioned in surrounding relation to lower planet gear portions 24a and a flange portion 26b positioned in overlying relation to planet gear portions 24a. Gear case 26 is positioned on mounting plate 18 and is suitably secured to the mounting plate. For example, and as seen in FIGS. 4 and 6, gear case 26 may be secured to mounting plate 18 utilizing circumferentially spaced integral snap portions 26c interacting with circumferentially spaced radially outwardly extending nubs 18i on plate 18.

Upper mounting plate 28 has an annular circular configuration and includes upper circumferentially spaced arcuate portions 28a interspersed with lower arcuate circumferentially spaced portions 28b. Each lower portion 28b is secured to the upper end 56c of a post 56 utilizing a screw 60 passing through an aperture 28c for engagement with a blind threaded bore in the upper end 56c and the upper end of each planet shaft 54 is piloted in an aperture 28d in a respective upper arcuate mounting plate portion 28a. Alternatively, mounting plate 28 may be flat with arcuate portions 28a and arcuate portions 28b lying in a common plane.

Drum ring gear 30 has a circular annular configuration and includes a central hub 30a, an outer peripheral wall 30b, and a top wall 30c. Central hub 30a is journaled on the upper end 40a of output shaft 40 utilizing bearings 64 with top wall 30c positioned in overlying relation to upper mounting plate 28 and ring gear teeth 30d on the inner periphery of peripheral wall 30b meshingly engaging reduced diameter planet gear portions 24b.

Cable drum assembly 12 includes a cable drum 70, a cable drum housing 72, a cable drum cap 74, and a cable 76.

Cable drum 70 has a circular annular configuration and includes a plurality of circumferentially spaced internal splines 70a coacting with a plurality of external circumferentially spaced splines 30e on ring gear 30 to slidably mount the cable drum 70 on ring gear 30.

Cable drum housing 72 includes an annular wall 72a, a pair of cable guide portions 72b, and a lower annular lip 72c. Cable housing 72 is fixedly secured to lower mounting plate 18 utilizing screws 79 engaging the housing and engaging respective lower mounting plate lugs 18d, 18e, and 18f. It will be seen that in assembled relation the lip 72c of the housing is positioned beneath drum 70 in overlying abutting relation to flange portion 26b of gear case 26.

Cable drum cap 74 is positioned with a snap fit over cable drum housing 72 with a central portion 74a of the cap piloting the upper end 40a of motor output shaft 40. Cap 74 also includes tangential portions 74b coacting with portions 72b of the drum to define entry and exit cable guide channels.

As an alternate mounting for the cable drum housing 72 and cable drum cap 74, cable drum housing 72 may be suitably attached to cable drum cap 74 which may in turn be secured to lower mounting plate 18.

Cable 76 is wrapped in known manner around drum 70 utilizing grooves 70d and accesses the drum through the entry and exit guide channels defined by the coaction of drum housing 72 and drum cap 74.

Rail assembly 14 includes a rail 80, pulleys 82, and a carrier 84.

Rail 80 includes an elongated main body portion 80a, an angled tail portion 80b, and a mounting portion 80c.

Mounting portion 80*c* is offset with respect to main body portion 80*a* and is fixedly secured to drive unit 10 utilizing screws 86 engaging the legs 18*a* of mounting plate 18.

Pulleys 82 are arranged to guide the cable 76 along the rail 80 in known manner.

Cable Carrier 84 is fixedly secured to an upper run of cable 76 and is arranged to move linearly along the rail 80 in response to actuation of the drive unit 10. As seen in FIG. 1, the power closure actuator of the invention may be used as the power drive for the sliding door 88 of a mini-van 90 with the drive unit 10 positioned in the rear quarter panel of the minivan and the rail extending forwardly along a side of the vehicle and the tail portion 80*b* extending inwardly into the doorway of the vehicle to guide the final closing movement of the door as the door is moved forwardly by the drive unit 10.

Figure 14:
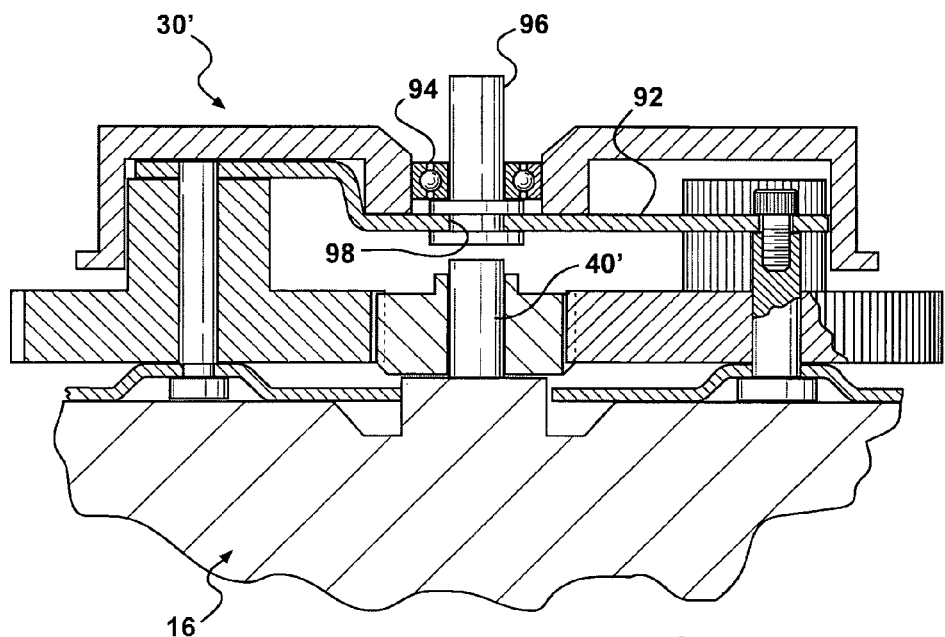
FIGS. 14 and 15 illustrate an alternate embodiment of the invention wherein the ring gear is mounted on a separate shaft coaxial with the motor shaft.
Figure 15:
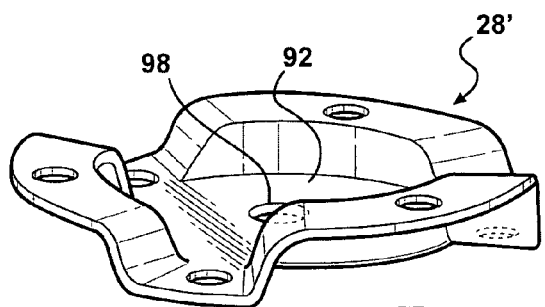

In the alternate embodiment of the invention power actuator seen in FIGS. 14 and 15, the upper mounting plate 28' includes a central solid disc portion 92 and the ring gear 30, rather than being journaled on the upper end 40*a* of motor output shaft 40, is journaled by a bearing 94 on a post 96 received in a central aperture 98 in disc portion 92 and fixedly up-standing from the disc portion. With this split shaft arrangement, side loads imposed on the cable drum are not transferred to the motor output shaft, thereby eliminating excessive drum loads that could bend the motor output shaft or put excessive load on the bearings.

Figure 16:
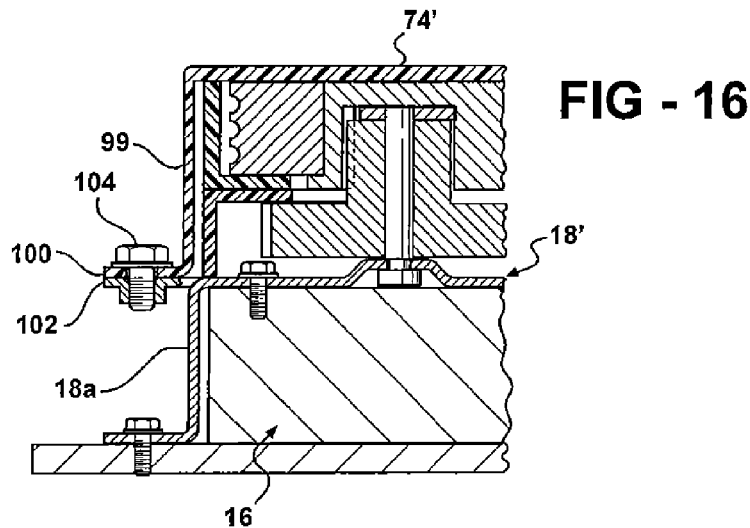
FIGS. 16 and 17 illustrate an alternate embodiment of the invention illustrating an alternate mounting for the cable from the drum cap.
Figure 17:
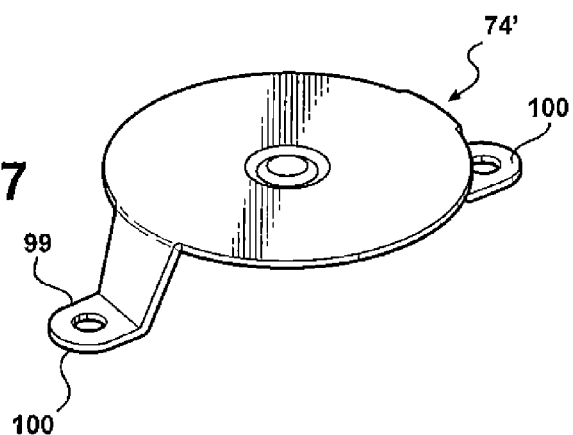

In the alternate embodiment of the invention actuator seen in FIGS. 16 and 17, the cable drum cap 74', rather than being snap mounted on the cable drum housing, includes circumferentially spaced downstanding arms 99 terminating in lugs 100 by which the cap is directly secured to tabs 102 on mounting plate 18' via screws 104.

Figure 18:
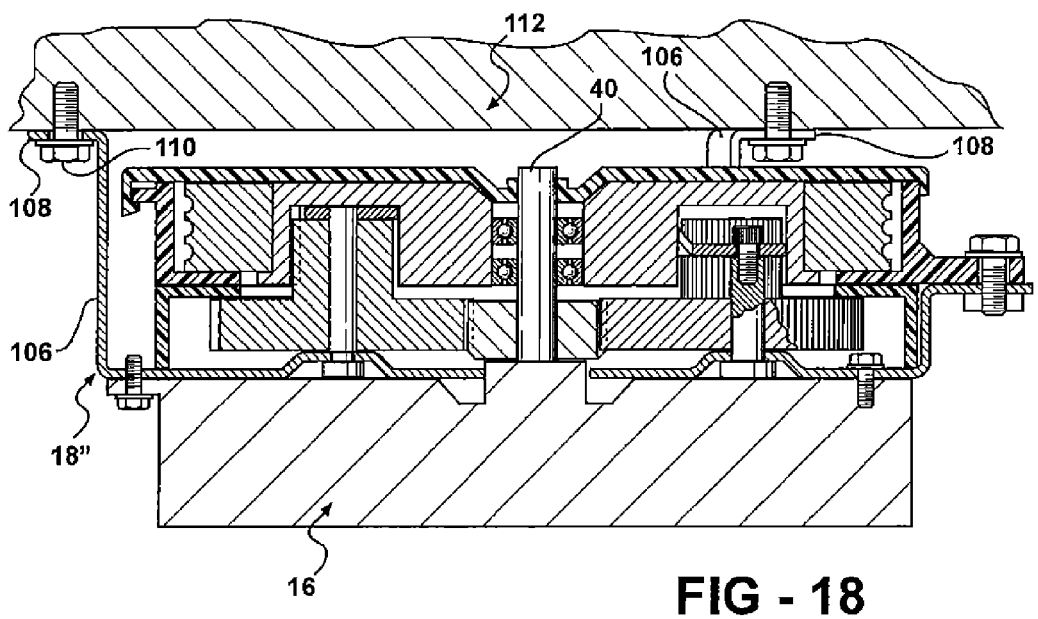
FIG. 18 illustrates an alternate embodiment of the invention illustrating an upside down mounting of the actuator on the associated vehicle body structure.

In the alternate embodiment of the invention seen in FIG. 18, the mounting plate 18" includes circumferentially spaced upstanding arms 106 terminating in lugs 108 by which the mounting plate and actuator are secured via screws 110 in upside down fashion to an overhead planar portion 112 of the associated vehicle such, for example as a sheet metal panel or other body structure.

In the alternate embodiment of the invention seen in FIG. 19, drive unit 10 is positioned close to the rail 80' but is not mounted directly on the rail but rather is mounted on vehicle body structure on the interior side of the body structure. This arrangement is very close to the direct rail mounting arrangement and therefore inherits most of the advantages of the direct mounting method such as compact design, ease of installation, and low friction and high efficiency thanks to the short and straight cable routing. The unique advantage of this arrangement as opposed to direct mounting on the rail is that the drive unit can be mounted in the interior side of the vehicle body structure to eliminate problems related to water or dust intrusion.

In the alternate embodiment of the invention seen in FIG. 20, the drive unit 10 is mounted on part of the vehicle body on the interior side of the body structure somewhere near the D pillar of the vehicle and separate cables 76 are directed via separate body mounted pulley structures 120 to opposite ends of rail 80" for attachment to opposite sides of carrier 84.

The alternate embodiment of the invention seen in FIG. 21 illustrates a so called in-door mounting in which the drive unit 10 is mounted within the door panel of a sliding vehicle door. Such in-door mounting is shown for example, in U.S. Pat. No. 6,553,719 assigned to the assignee of the present invention.

Figure 22:
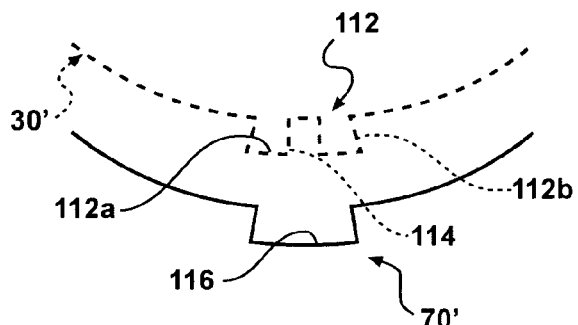
FIGS. 22 and 23 illustrate a modified spline construction.
Figure 23:
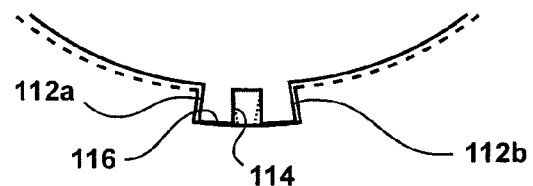

FIGS. 22 and 23 illustrate an alternate spline configuration for the splined driving interconnection between ring gear 30' and cable drum 70'. Specifically, the external splines 112 on the ring gear are arranged in pairs 112*a*, 112*b* which are separated by a slot 114 and which are flexible so that the spline halves can be squeezed or compressed together prior to insertion in the cable drum internal splines 116 to insure a tight fit between the external splines on the ring gear and the cable drum. As the spline halves are compressed together the slot 114 is compensatingly narrowed and the spline halves assume a composite width approximating the width of the internal spline on the cable drum.

Figure 24:
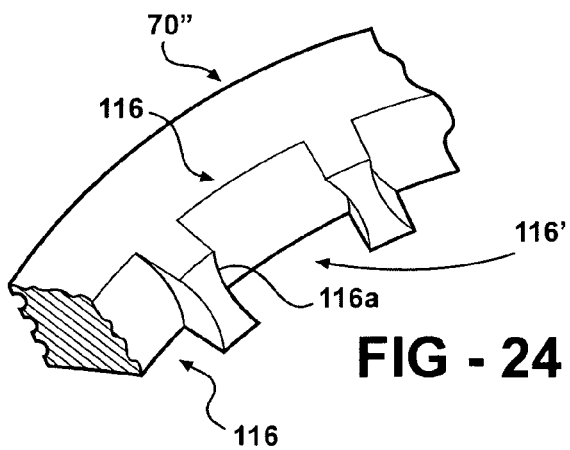
FIGS. 24 and 25 illustrate a further modified spline construction.
Figure 25:
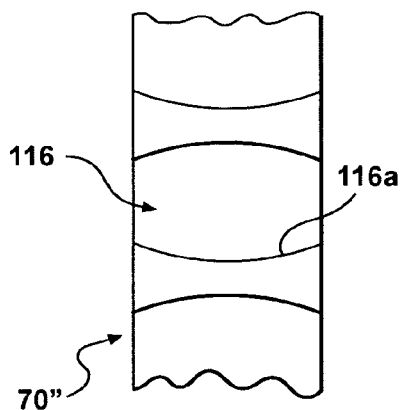

FIGS. 24 and 25 illustrate a further alternate spline configuration for the splined driving interconnection between the ring gear and drum 70". Specifically, the internal splines 116 on drum 70" have an arcuate concave configuration seen at 116*a*. This arrangement insures that the drum will not inadvertently move axially relative to the ring gear.

The power closure actuator of the invention will be seen to provide many important advantages. Specifically, the cable drum assembly may be readily removed from the drive unit to facilitate servicing of the cable drum assembly by simply loosening screws 79 and lifting the cable drive assembly off of the drive unit; the combination of a flat brushless motor, with low friction and high torque, and a high efficiency planetary gear system, with low gear ratio and low friction, enables the actuator to be manually back-drivable and thus eliminates the need for a separate clutch to disengage the drive unit from the remainder of the system; the flat pancake configuration of the motor provides a reduced overall height of the drive unit to facilitate installation in crowded automotive environments; the lower mounting plate mounting the individual shafts replaces a traditional metal casting or reinforced plastic unit with consequent savings in cost and weight; the entire gear set is readily assembled and disassembled utilizing screws; the brushless pancake motor provides a low speed motor with high torque and reduced vibration; the low gear ratio allows less friction and more robustness and gear strength due to large tooth module; and the reduced number of components and the ease of assembly reduces the assembly cost and increases reliability.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A power door actuator assembly comprising:
   a rail assembly adapted to be mounted on a vehicle body adjacent a door opening of the vehicle body;
   an electric motor having an output shaft extending upwardly from an upper face of the motor;
   a sun gear on the output shaft of the motor;
   a plurality of compound planet gears each having a large diameter lower portion meshingly engaging the sun gear and a small diameter upper portion;
   a ring gear surrounding and meshingly engaging the small diameter upper portions of the planet gears;
   a cable driven by the ring gear and extending at least in part along the rail assembly;
   a mounting plate adapted to be secured to the vehicle body proximate the rail assembly and including a main body portion positioned in overlying, confronting relation and secured to the upper face of the motor and a central aperture through which the motor output shaft extends; and a plurality of planet shafts extending upwardly from the mounting plate main body portion in a circumferentially spaced relation to the output shaft wherein each of said shafts journals a respective one of said planet gears thereon;

a plurality of support posts separate from and spaced from the planet shafts and upstanding from the mounting plate main body portion in a circumferentially spaced relation to the motor output shaft; and a support plate fixedly secured to upper ends of the support posts at circumferentially spaced locations on the support plate and receiving upper ends of the planet shafts.

2. A power door actuator assembly according to claim 1 further including a bearing structure on an upper end of the motor output shaft rotatably supporting the ring gear.

3. A power door actuator assembly according to claim 1 wherein the ring gear is rotatably supported by a separate shaft coaxial with the motor output shaft.

4. A power door actuator assembly according to claim 1, wherein the actuator assembly further includes a cable drum secured to the ring gear.

5. A power door actuator assembly according to claim 4 wherein:
the actuator assembly is intended for moving a motor vehicle closure member; and
the actuator assembly is adapted to be mounted within the closure member.

6. A power door actuator assembly according to claim 4 wherein said cable is wrapped around said cable drum, said cable drum is disposed in a drum housing assembly, said housing assembly encircling the said drum cable drum and defining entry and exit guide channels for said cable.

7. A power door actuator assembly according to claim 6, wherein the drum housing assembly includes a lower annular member surrounding the cable drum and a cover member overlying the cable drum and coacting with the lower annular member to encapsulate the cable drum and define the entry and exit guide channels.

8. A power door actuator assembly according to claim 7, wherein the drum housing assembly is fixedly secured to the mounting plate.

9. A power door actuator assembly according to claim 4, wherein the cable drum includes a plurality of circumferentially spaced internal splines coacting with a plurality of circumferentially spaced external splines on the ring gear to slidably mount the cable drum on the ring gear to facilitate removal of the cable drum from the ring gear for servicing.

10. A power door actuator assembly according to claim 4 wherein the rail assembly includes an elongate rail plate, at least one pulley mounted on the rail plate, and a carrier, said cable being wrapped around the drum, guided around the pulley, and fixedly secured to the carrier, the carrier moving along the rail plate in response to rotation of the cable drum.

11. A power door actuator assembly according to claim 10, wherein an end of the rail plate is secured to the mounting plate.

12. A power door actuator assembly according to claim 10 wherein:
the actuator assembly is intended for moving a motor vehicle closure member;
the rail plate is separate from the mounting plate; and
the mounting plate and the rail plate are adapted to be separately secured to the vehicle body.

13. A power door actuator assembly according to claim 12 wherein the cable enters the rail plate at opposite ends of the rail plate.

14. A power door actuator assembly according to claim 10 wherein:
the mounting plate is adapted to be secured to a planar member of the vehicle body with the sun gear and the planet gears sandwiched between the motor and the planar member.

15. A power door actuator assembly according to claim 1 further including:
a journal post centrally upstanding from the support plate; and
the ring gear is rotatably supported by the journal post.

16. A power door actuator assembly according to claim 1, further including an annular gear case surrounding the lower portions of the planet gears and positioned on the mounting plate.

17. A power door actuator assembly according to claim 1, wherein the mounting plate is secured to a planar member of the rail assembly and the motor is sandwiched between the mounting plate and the planar member.

18. A power door actuator assembly comprising:
a rail assembly adapted to be mounted on a vehicle body adjacent to a door opening defined by the vehicle body;
a brushless pancake electric motor having a flat upper face and a central output shaft extending upwardly from the upper face;
a mounting plate adapted to be mounted on the vehicle body proximate the rail assembly and including a main body portion positioned in overlying confronting relation and secured to the flat upper face of the motor and including a central aperture through which the motor output shaft extends;
a plurality of planet shafts extending upwardly from the mounting plate main body portion in a circumferentially spaced relation to the output shaft;
a sun gear drivingly connected to the motor output shaft above the mounting plate main body portion;
each said planet shaft having a compound planet gear journalled thereon above the mounting plate main body portion and each said compound planet gear including a large diameter lower portion supported on the mounting plate main body portion and meshingly engaging the sun gear and a coaxial small diameter upper portion;
a ring gear surrounding and meshingly engaging the small diameter upper portions of the planet gears;
a cable driven by the ring gear and extending along the rail assembly;
a plurality of support posts upstanding from the mounting plate main body portion in a circumferentially spaced relationship to the motor output shaft and to the planet shafts; and
a support plate fixedly secured to upper ends of the support posts at circumferentially spaced locations on the support plate and receiving upper ends of the planet shafts.

19. A power door actuator assembly according to claim 18, wherein the mounting plate is secured to a planar member and the motor is sandwiched between the mounting plate and the planar member.

20. A power door actuator assembly according to claim 18, further including a bearing structure on an upper end of the motor output shaft rotatably supporting the ring gear.

21. A power door actuator assembly according to claim 18 wherein the ring gear is rotatably supported by a separate shaft coaxial with the motor output shaft.

22. A power door actuator assembly according to claim 18, further including a cable drum secured to the ring gear.

23. A power door actuator assembly according to claim 22, wherein the rail assembly includes an elongated rail plate, a pulley mounted on the rail plate, and a carrier, said cable being wrapped around the cable drum, guided around the pulley, and fixedly secured to the carrier, the carrier moving along the rail plate in response to rotation of the cable drum.

24. A power door actuator assembly according to claim 23, wherein an end of the rail plate is secured to the mounting plate.

25. A power door actuator assembly according to claim 22, wherein the cable drum is removably attached to the ring gear to facilitate removal of the cable drum from the ring gear for servicing.

26. A power door actuator assembly according to claim 25 further including:
   a journal post centrally upstanding from the support plate; and
   the ring gear is rotatably supported by the journal post.

27. A power door actuator assembly according to claim 22, further including a cable drum housing assembly encircling the cable drum and defining entry and exit guide channels for said cable.

28. A power door actuator assembly according to claim 27, wherein the drum housing assembly includes a lower annular member surrounding the cable drum and a cover member overlying the cable drum and coacting with the lower annular member to encapsulate the cable drum and define the entry and exit guide channels.

29. A power door actuator assembly according to claim 28, wherein the cable drum housing assembly is fixedly secured to the mounting plate.

30. A power door actuator assembly according to claim 18, further including an annular gear case surrounding the lower portions of the planet gears and positioned on the mounting plate.

* * * * *